United States Patent Office 3,051,630
Patented Aug. 28, 1962

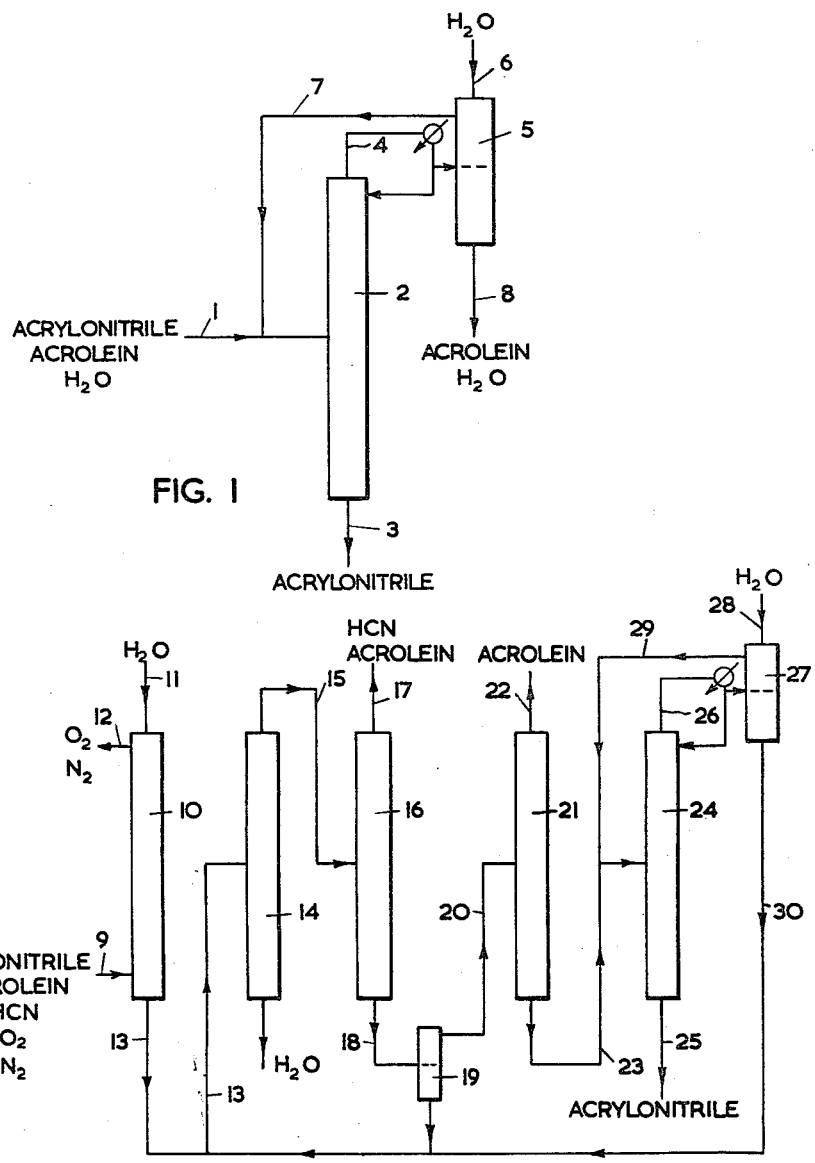

3,051,630
PURIFICATION OF ACRYLONITRILE
David James Hadley, Epsom Downs, and John Bernard Bream, Banstead, England, assignors to The Distillers Company Limited, Edinburgh, Scotland, a British company
Filed Jan. 13, 1959, Ser. No. 786,534
Claims priority, application Great Britain Jan. 25, 1958
3 Claims. (Cl. 202—71)

The present invention relates to the purification of wet acrylonitrile containing dissolved acrolein. Such mixtures are obtained, for instance, in processes in which acrylonitrile is produced by the catalytic vapour phase reaction between acrolein, ammonia and oxygen.

In the production of acrylonitrile to be used for polymerisation purposes, the removal of even small amounts of impurities, which might interfere with the polymerisation, is important. In particular, the presence of small amounts of acrolein is disadvantageous, and acrolein can only be tolerated in polymerisation grade acrylonitrile in proportions below about 0.05%.

However, in spite of the widely differing boiling points of acrolein and acrylonitrile and their azeotropes with water, the complete separation of acrylonitrile and acrolein in the presence of water, by fractional distillation, is not possible. When a sample of acrylonitrile containing dissolved water and, for instance, 5 to 10% of acrolein is fractionally distilled to take off an overhead fraction containing the acrolein as an azeotrope with water, but substantially no acrylonitrile, no matter how efficient the fractionating column the liquid acrylonitrile fraction obtained from the base of the column invariably contains, in addition to water, between 0.3 and 0.5% of acrolein. To obtain a base product containing less than 0.05% of acrolein a substantial proportion of acrylonitrile has to be taken off in the overhead fraction with the acrolein, and has subsequently to be separated by further distillation steps.

According to the present invention the process for the recovery of acrylonitrile from an acrylonitrile starting material containing dissolved acrolein and water comprises fractionally distilling the starting material to separate an overhead fraction, containing substantially all of the acrolein and the water together with a proportion of the acrylonitrile, and a bottom fraction of highly pure, dry acrylonitrile, mixing the overhead fraction with water to form an aqueous phase and an acrylonitrile phase, and returning the acrylonitrile phase to the fractional distillation.

The process of the present invention is particularly applicable to the purification of acrylonitrile produced by the catalytic vapour phase reaction of acrolein with ammonia and molecular oxygen. In such reactions the crude acrylonitrile is usually recovered in the form of a dilute aqueous solution, which also contains varying amounts of acrolein and hydrogen cyanide, by contacting the gaseous reaction product with water, preferably after neutralisation of any unreacted ammonia. The crude nitrile solution is then concentrated to form an impure oil which may be treated for the removal of substantially all of the hydrogen cyanide, for instance according to the process set forth in our co-pending U.S. application No. 764,444, filed September 30, 1958, and now abandoned, to obtain acrylonitrile containing dissolved water and varying amounts of acrolein, for instance between 5 and 10%.

The starting material for the process of the present invention consists of wet acrylonitrile containing acrolein as an impurity. The amount of water in the acrylonitrile is not critical. The solubility of water in acrylonitrile is about 3%, so that if any larger amounts are present a separate aqueous phase will form and can be separated by decantation. The process of the invention is not applicable to anhydrous acrylonitrile, which can be separated from acrolein by simple fractionation. However, the smaller the proportion of water present in the starting material, the smaller is the proportion of acrylonitrile which has to be removed in the overhead fraction. It is, therefore, preferred to use a starting material containing as little water as possible, for instance about 1 to 2%.

The proportion of acrolein in the starting material may vary over a moderately wide range. Thus the acrylonitrile produced as described above containing dissolved water and between 5 and 10% or more of acrolein can be used as the starting material in the process of the present invention. It is, however, preferred to use as starting material wet acrylonitrile containing only 0.3 to 0.5% of acrolein and this may be readily obtained by subjecting wet acrylonitrile containing 5 to 10% or more of acrolein to a fractional distillation in which a fraction containing the acrolein as an azeotrope with water, and a small proportion of acrylonitrile, is taken off overhead, while wet acrylonitrile containing between 0.3 and 0.5% of acrolein is removed as the base product.

The fractional distillation according to the process of the invention may be carried out in any suitable manner, for instance in a normal fractionating column provided with reflux. The essential feature of the process is that the acrylonitrile in the lower part of the still is essentially anhydrous, since only under these conditions can acrylonitrile completely free from acrolein be obtained from the base of the column. The overhead fraction, containing all of the acrolein and the water together with some acrylonitrile, is suitably condensed and passed to a phase separator provided with a water inlet and means for adequate mixing of the condensed overhead fraction and the incoming water.

The amount of water added to the overhead distillate may vary within moderately wide limits, suitably between ½ and 4 times the weight of the feed to the still. Since a small proportion of acrylonitrile passes into the aqueous phase, it is preferred to reduce the amount of water added as much as possible, for instance to about the same order as the weight of the feed to the still. If the water feed to the phase separator is reduced too much, however, insufficient acrolein will be transformed into and removed with the aqueous phase, and the acrolein will then accumulate in the column and will eventually appear in the base product. This lower limit for the amount of water to be added to the phase separator will vary widely depending on the composition of the starting material, and on the rate of distillation employed, and can readily be determined for any particular set of conditions.

The upper acrylonitrile in the phase separator containing small proportions of water and acrolein is continuously returned to the fractionating column at any suitable point. If desired it may be combined with the feed to the column, or introduced at the top of the column as part or all of the liquid reflux to the column. The lower aqueous phase obtained in the phase separator contains substantially the same amount of acrolein as is present in the feed to the fractionating column, together with small amounts of dissolved acrylonitrile. This is suitably recycled to a previous stage in the process. If the starting material for the process of the invention contains a substantial proportion, e.g. 5 to 10% of acrolein, the aqueous phase from the phase separator may be regarded as the main outlet for acrolein in the recovery process, in which case this acrolein, after removal of the water and, if desired, of the small amounts of acrylonitrile, can be recycled to the oxidation reactor, in which the acrylonitrile is produced. In the preferred embodiment, however, in which the starting material contains only 0.3 to 0.5% of acrolein, the aqueous phase from the phase separator can advantageously be recycled to a previous stage in the recovery process; for instance, when the oxidation reaction product is scrubbed with water to obtain the acrylonitrile as a dilute aqueous solution which is subsequently concentrated the aqueous phase from the phase separator is preferably recycled to the concentration stage. In this case the main outlet for acrolein is at another point in the recovery process.

The process of the present invention is further described with reference to the accompanying flow diagrams, wherein FIGURE 1 depicts the arrangement of apparatus and flow of material according to the invention, and FIGURE 2 illustrates a complete system starting with the product of the catalytic vapour phase reaction of acrolein with ammonia and oxygen.

Referring to FIGURE 1, wet acrylonitrile containing acrolein as an impurity is fed by line 1 to the fractionating column 2 provided with conventional reflux equipment. A liquid fraction of dry acrylonitrile containing les than 0.05% of acrolein is withdrawn from the base of column 2 by line 3. The overhead fraction from column 2 is passed by line 4 to phase separator 5 which is provided with a water feed by line 6 and means (not shown) for mixing the condensed overhead fraction and the incoming water. In the phase separator two phases separate and the upper acrylonitrile phase is continuously returned by line 7 to the column 2. The aqueous phase containing acrolein and traces of acrylonitrile is withdrawn by line 8.

Referring to FIGURE 2, this illustrates the application of the process of the present invention to the purification of acrylonitrile produced by the catalytic vapour phase reaction of acrolein with ammonia and molecular oxygen. The gaseous reaction product, after neutralisation of any unreacted ammonia, is fed by line 9 to the scrubber 10 provided with a water feed 11 and a vent 12. A dilute solution of acrylonitrile passes by line 13 to the still 14 in which it is concentrated, and the acrylonitrile is taken off overhead as an azeotrope with water and fed directly, in vapour form, by line 15 into still 16. In still 16 hydrogen cyanide together with some acrolein is removed as an overhead fraction by line 17, and the base product is fed by line 18 to a phase separator 19 from which the upper acrylonitrile phase, containing acrolein and water in solution, is fed by line 20 to still 21. The aqueous phase from phase separator 19 is recycled to still 14. From still 21 substantially all of the remainder of the acrolein is removed as an overhead fraction by line 22, and the base product containing about 0.3 to 0.5% of acrolein and some water constitutes the starting material for the process of the present invention.

This acrylonitrile is fed by line 23 into still 24, from the base of which pure dry acrylonitrile, containing less than 0.05% of acrolein, is obtained as a liquid fraction by line 25. The overhead fraction from column 24 is passed by line 26 to the phase separator 27, which is provided with a water feed 28 and means (not shown) for mixing the condensed overhead fraction and the incoming water. In the phase separator two phases separate, and the upper acrylonitrile phase is continuously returned by line 29 to the column 24. The aqueous phase containing acrolein and small amounts of acrylonitrile in solution is recycled by line 30 to the still 14.

All of the stills in FIGURE 2 were provided with conventional reflux equipment. In addition stills 16, 21 and 24 were provided with a top feed of 20% solution of pyrogallol in acrylonitrile, as polymerisation inhibitor, at a rate such that the bottom product contained about 0.1% by weight of pyrogallol.

The process of the present invention is further illustrated with reference to the following example.

*Example*

The following example illustrates a process for the recovery of acrylonitrile from a mixture containing acrolein and water in solution carried out according to FIGURE 2.

A gaseous mixture containing 2% by volume of acrolein and 2.2% by volume of ammonia in air was reacted over a catalyst to give a gaseous reaction product containing acrylonitrile, acrolein and hydrogen cyanide in the molar ratio 7:1:1. The reaction product was scrubbed with water in the scrubber 10. The aqueous solution from scrubber 10 was fed to the continuous still 14, the distillate from which contained the organic materials mixed with about 10% of water. This distillate was fed in vapour form by line 15 to still 16, in which substantially all the hydrogen cyanide and some of the acrolein was removed overhead by line 17. The base product was passed to the phase separator 19 in which it separated into two layers, the upper layer consisting of acrylonitrile mixed with 4.6% of acrolein, 2.2% of water and <0.1% of hydrogen cyanide. This layer was fed by line 20 to still 21, which had about 30 theoretical plates, and was operated at a reflux ratio of 10:1 and a head temperature of 63° to 65° C. The distillate from still 21 contained acrolein and acrylonitrile in the weight ratio of 3.5:1.

The base product from still 21, acrylonitrile, containing 0.4% of acrolein and 1.6% of water, constituted the starting material for the process of the present invention. This mixture was fed to still 24, which had about 30 theoretical plates and was operated at a reflux ratio of 10:1 and a head temperature of 68° C. to 69° C. The distillate from still 24 was washed in phase separator 27 with 1.2 parts of water per part of feed to still 24. The upper acrylonitrile layer separating in phase separator 27 was returned to the centre of still 24 by line 29, while the lower layer in the phase separator 27, which contained acrolein and about 2% of the acrylonitrile in the feed to still 24, was returned by line 30 to still 14.

The base product from still 24 contained about 99.8% by weight of acrylonitrile and less than 0.05% of acrolein.

We claim:

1. The process which comprises distilling a mixture consisting substantially of acrylonitrile, water and 0.3–0.5% acrolein at a temperature to drive off a fraction consisting of all of the water and acrolein together with substantial amounts of acrylonitrile, withdrawing said fraction as an overhead fraction, refluxing said fraction, passing a portion of the reflux to the distilling phase, and washing another portion with sufficient water to form an aqueous phase containing acrolein and only a small proportion of acrylonitrile and a water-saturated acrylonitrile phase, separating and introducing the acrylonitrile phase to the distilling phase, and withdrawing as the bottoms fraction highly pure, dry acrylonitrile.

2. The process as set forth in claim 1 wherein the starting material contains between about 1 and 2% water.

3. The process which comprises distilling a mixture consisting of about 0.4% acrolein, about 1.6% water, and the remainder acrylonitrile, at a temperature of about 68–69° C. to drive off a fraction of all of the water and acrolein together with substantial amounts of acrylonitrile, withdrawing said fraction overhead, refluxing said fraction, passing a portion of the reflux to the distilling phase, and washing another portion with sufficient water to form an aqueous phase containing acrolein and only a small proportion of acrylonitrile and a water-saturated acrylonitrile phase, separating and introducing the acrylonitrile phase to said distilling phase and withdrawing as the bottoms fraction highly pure, dry acrylonitrile containing no more than .05% acrolein.

References Cited in the file of this patent

UNITED STATES PATENTS 2,773,088　Maslan _____ Dec. 4, 1956
2,809,927　Staib _____ Oct. 15, 1957

FOREIGN PATENTS 158,485　Australia _____ Aug. 26, 1954
541,132　Canada _____ May 21, 1957

OTHER REFERENCES

Weissberger: "Distillation," published by Interscience Publishers, Inc., New York, 1951 (pp. 366–367 relied upon).

Horsley: "Azeotropic Data," published by American Chemical Society, 1952 (p. 6 relied upon, item 149).